No. 762,506. PATENTED JUNE 14, 1904.
A. UREN.
AXLE NUT.
APPLICATION FILED DEC. 24, 1902.
NO MODEL.

WITNESSES:
Alfred Breitung
William H. Jewett

INVENTOR.
Andrew Uren
BY Frank E. Adams
ATTORNEY.

No. 762,506.                                            Patented June 14, 1904.

UNITED STATES PATENT OFFICE.

ANDREW UREN, OF SEATTLE, WASHINGTON.

AXLE-NUT.

SPECIFICATION forming part of Letters Patent No. 762,506, dated June 14, 1904.

Application filed December 24, 1902. Serial No. 136,479. (No model.)

*To all whom it may concern:*

Be it known that I, ANDREW UREN, a citizen of the United States of America, and a resident of the city of Seattle, in the county of King and State of Washington, have invented certain new and useful Improvements in Axle-Nuts, of which the following is a specification.

My invention relates to improvements in axle-nuts, and has special reference to a lubricating-nut of this class especially useful on axles of the sheaves of pulley-blocks or the like.

Among numerous objects attained by this invention and readily understood from the following specification and accompanying drawings, included as a part thereof, is the production of a simple and efficient axle-nut embodying essential features of adaptability and general utility, which greatly facilitates the application of oil to the axle and insures a positive and constant lubrication of the bearing-surface.

The above-mentioned and numerous other objects equally as desirable are attained by the construction, combination, and arrangement of parts as disclosed on the drawings, set forth in this specification, and succinctly pointed out in the appended claims.

Figure 1:
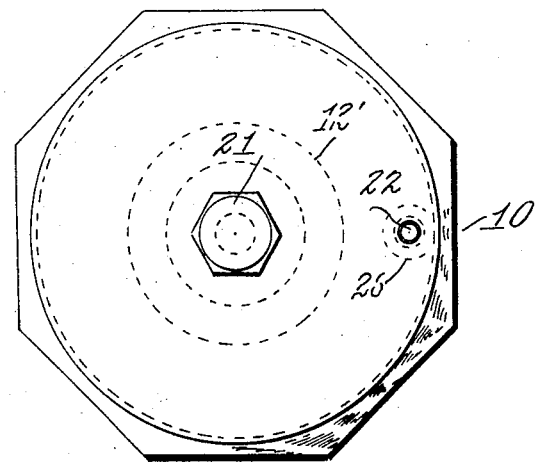
Figure 2:
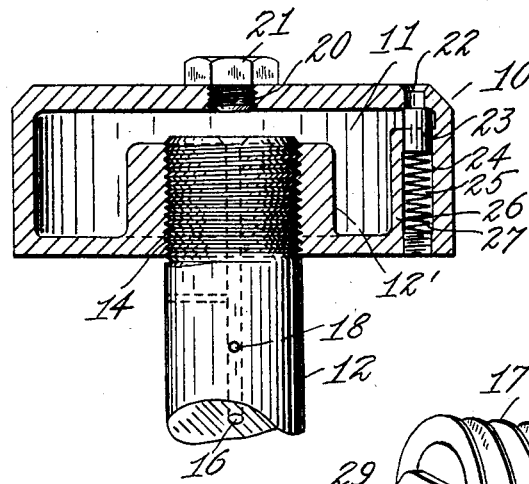
Figure 3:
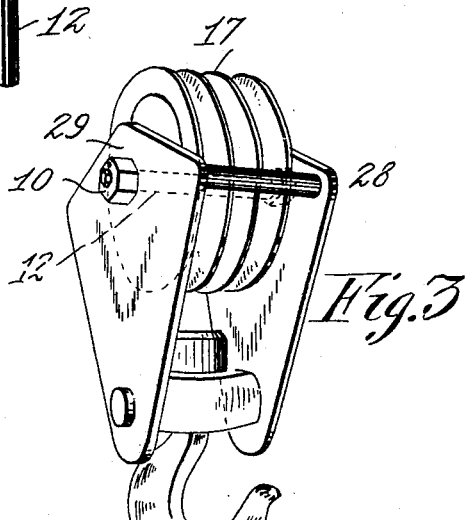

With reference to the drawings filed herewith and bearing like reference characters for corresponding parts throughout, Figure 1 is a plan view of my improved lubricating axle-nut. Fig. 2 is a vertical transverse section of same with a portion of an axle indicated in relative position. Fig. 3 is a view in perspective of an ordinary pulley-block indicating the improved nut engaged with the axle of the sheave; and Fig. 4 is a side view, on reduced scale, of the axle of the block removed.

This invention includes an axle-nut, as 10, which is rendered in the form of a shell of any desired shape, but as now considered conveniently made in the form of an ordinary nut and may be either square, hexagonal, or octagonal. This shell is suitably formed to inclose a chamber, as 11, adapted to hold a supply of oil or like lubricant and preferably made as large as the required thickness of the shell will permit. In one side wall of this shell a suitable axle-receiving bore, as 14, is formed, and screw-threads are provided on the wall of the bore to engage corresponding screw-threads on the end of an axle, as 12. This nut is preferably formed with a comparatively thick boss 12' on the inner surface of this side wall concentric with said bore, which bore is extended through this boss to conveniently offer a greater length of bearing for the nut on the axle.

Figure 4:
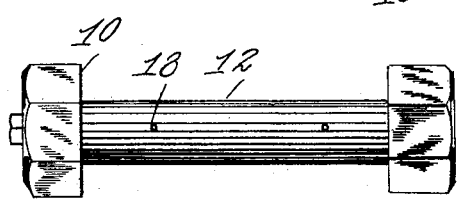

In the present embodiment of the invention axle 12 consists of a bolt, Fig. 4, which is in the main of the ordinary construction, but is formed with a suitable longitudinally-disposed main channel 16, preferably located in the center of the bolt and extending from the screw-threaded end thereof to the bearing-surface of the the sheave, as 17, and laterally-disposed channels 18 are formed between the bearing-surface and the main channel for the distribution of oil.

To afford convenient means whereby a section of wicking or the like can be readily placed in chamber 11 and threaded into channel 16, so that a flow of lubricant will be insured, a screw-threaded aperture, as 20, is provided in the top wall of the nut, and a cap-bolt, as 21, is removably engaged with these screw-threads to keep the aperture normally closed, and a second aperture, as 22, is formed in this wall of the nut adjacent the marginal edge, through which oil is passed to the chamber. This aperture is normally kept closed by a suitable spring-pressed plug, as 23, which is preferably slidably mounted in the chamber in a suitable guideway 24, conveniently consisting of a recess 25, provided in a boss, as 26, formed on the inner surface of the marginal wall of chamber 11, directly beneath aperture 22, and a suitable coiled spring 27 is placed in this recess beneath the plug and serves to yieldingly press same against the top wall of the nut, and thereby serves to normally close said aperture.

The application of this axle-nut to the axle of a sheave or the like of a pulley-block, as 28, will be readily understood, as it simply requires cutting the axle, as 12, of proper length for the screw-threaded end thereof to project beyond the side plate, as 29, of the block slightly less than the thickness of the nut, so that the end of the bolt will clear the under surface of the outer wall of the nut when in place and allow the lubricant to pass from chamber 11 into the main channel 16, from whence it passes to the bearing-surface through the laterals 18.

This axle-nut is simple and inexpensive of construction, durable in use, and insures constant lubrication of the bearing-surface of the axle, the supply of lubricant being readily replenished by simply pressing inwardly on plug 23 with the nose of the oil-can to permit the oil to flow into the chamber or reservoir 11.

Having thus described my invention, what I claim as new, and desire to secure by Letters Patent of the United States of America, is—

1. An axle-nut comprising a shell inclosing a chamber adapted to hold a supply of oil and having a centrally-located boss on the inner face of one side wall and a screw-threaded axle-receiving bore extending through said wall and boss to the chamber, and an aperture in the wall of said shell for the introduction of oil.

2. The combination with an axle-bolt having a longitudinally-disposed main oil-channel opening to the screw-threaded end and laterally-disposed channels extending from the main channel to the bearing-surface of the axle; of a nut comprising a shell inclosing a chamber adapted to hold a supply of oil and having a centrally-located boss on the inner face of one side wall and a screw-threaded, bolt-engaging bore extending through said wall and boss to the chamber, an aperture in the wall of said shell for the introduction of oil and means to normally close said aperture.

Signed at Seattle, Washington, this 10th day of November, 1902.

ANDREW UREN.

Witnesses:
W. PARRY SMITH,
C. A. McKENZIE.